United States Patent Office 2,846,315
Patented Aug. 5, 1958

2,846,315

MANUFACTURE OF DOUGHNUT SUGAR

George Jesse Rosner, Englewood, N. J., assignor to The Griffith Laboratories, Inc., Chicago, Ill., a corporation of Illinois No Drawing. Application December 4, 1956
Serial No. 626,096

14 Claims. (Cl. 99—143)

The present invention relates to doughnut sugar, and in particular to an improved method of producing it.

Doughnut sugar is commonly composed of crystals of sugar in large quantity and a normally solid fat in small quantity, with or without starch in small quantity. The sugar and starch contribute whiteness to coated doughnuts. The sugar imparts sweetness. The starch functions primarily in mechanical applications to doughnuts. The fat binds the sugar and starch to the doughnut, and additionally serves as a moisture-barrier coating for individual sugar crystals to prevent deliquescence.

The term "fat" as used throughout the specification and claims is intended to include any and all edible natural and processed animal and vegetable fats and oils, and any and all shortenings whether natural, hydrogenated or rearranged fats and oils, with or without added emulsifiers and other modifiers, and mixtures of any of the foregoing.

Practically, about 7.5% by weight has been the upper limit for fat content. Above that amount, the composition has over-slip; it does not adhere well to the doughnut; and it does not move satisfactorily through the sugaring machine. This over-slip, due to the presence of fat, is the tendency of the composition to slide off a perforated drum through which it should enter to snow upon doughnuts tumbled in the drum. Starch is commonly used in amounts from 5% to 20% of the composition to avoid over-slip. Raising starch content and lowering content of fat contribute to the avoidance of over-slip.

Because of the limited amount of fat, there is the problem of compounding the ingredients to secure the maximum functioning of the fat. A common difficulty is to secure uniform and complete coverage of the sugar crystals. Uncovered sugar surface easily picks up moisture leading to its dissolution.

One prior method is to mix the starch and sugar, and then spray melted fat into the mixture. This causes some fat to enter cracks and crevices in crystals, wherein it performs no function at all on the doughnut, and wherein it functions negatively in reducing the amount available for coating the sugar. Also, some crystals are over-coated and some under-coated.

Another prior method is to cream some of the solid particles with all the fat, and then mix into the cream the remaining solid particles. This also results in non-uniformity. The creamed solids receives too much fat on it and into it, and not enough rubs off on the additional solids. This results in spotty coverage of the doughnut, with lumps in one or more areas and uncovered spots elsewhere.

The present invention aims to overcome these defects and to provide an improved doughnut sugar.

It is the general object to compound the doughnut sugar so as to improve the uniformity of distribution of fat on the sugar.

It is also an object to minimize the penetration of fat into sugar crystals.

It is a particular object of the invention to decrease the natural cohesion of fat crystals by mechanically plasticizing the fat prior to and for contact with the sugar.

It is also an object of the invention to vary the properties of the doughnut sugar due to the various components of the fat, by the manner in which the several components are employed in compounding.

Various other and ancillary objects and advantages of the invention will become apparent from the following description and explanation of the invention.

Normally solid fat of the type used for shortening and herein for doughnut sugar is a two-phase plastic mixture of solid and liquid. The solid phase is fat crystals. The liquid phase is fatty oil. The mixture is thixotropic. The solid particles form stable jams or arches which support the mixture as a solid against small stresses, such as gravity. Application of sufficient force by mechanical working breaks the jams and the fat becomes temporarily softer with plastic flow. Mechanical working such as whipping causes this change, in the manner typical of thixotropic mixtures. On standing the acquired plastic flow is lost, and it is believed that the crystals again orient themselves into a more stable structural arrangement within the liquid phase. As stated by Bailey in "Industrial Oil and Fat Products," 2nd ed., 1951, page 218, the precise cause of thixotropy in fats is unknown.

The present invention takes advantage of thixotropy in the normally solid fats suitable for doughnut sugar, by mechanically converting the stable hard condition of the fat to its more plastic condition, and mixing the plasticized fat with the doughnut sugar solids while the fat remains in its plastic condition.

The preferred way to effect the plastic condition is by mechanical whipping. This method incidentally incorporates air and thus distends the volume of the fat. Incorporation of air is not necessary, but acts as an indicator for a sufficiency of mechanical working. Thus, when the volume is increased by 15%, no more working will benefit it. Mechanical working which does not incorporate air may also be practiced, and viscosity determinations may be made to determine when the maximum effect has been attained.

The stage of plastic flow effected by mechanical working is distinguishable from lowered viscosity obtained by heating. Thus, in practicing the invention a cold solid fat may be heated to a temperature which renders it soft and plastic without melting, such as 68° to 75° F. Without additional heating the plasticity or flow is then greatly increased by mechanical working preferably whipping for about 15 minutes. For convenience, the mechanically plasticized fat is hereinafter referred to as the "whip," without of necessity indicating that air has been incorporated into the fat.

The fat mixture for the sugar, or a normally solid fraction thereof, is mechanically plasticized. When this is done by whipping for about 15 minutes the bulk of the solid fat may thus be increased up to about 12% in volume, forming the "whip." Then the whip and the solid particles are mixed in the same or different mixer, for about 25 minutes to assure uniformity. The resulting granular product is then passed through a hammermill. The mill breaks up lumps and subdivides sugar crystals. The fat being softer than the sugar is thus further spread over newly formed sugar surfaces, assisted by the heat of milling. The mill assures the discharge of a non-lumpy fine powder.

The fat used is commonly a mixture of various components. As used in the prior art the fats are homogenously blended as a single ingredient to be added to the sugar. By means of the present invention two fats of the same analytical composition may be variously provided with differing properties, to create doughnut sugars of differing properties.

Generally considered normally solid fat has (1) a low-melting component, which may be edible oil, (2) a medium-melting fat, for example one melting in the range from 90° to 120° F., and (3) a fat melting in the range from 140° to 160° F., such as stearin. By the present invention, the limit of fat content of doughnut sugar may be raised to 9% by weight, compared to the conventional maximum of 7.5%, and excellent results are achieved with as little as 3.5%.

One or more of these fat components may be whipped initially, and the remainder added and then whipped in. Thus, the components are not homogenized, although each may be homogeneously distributed throughout the whip. Also, one of the fat components, preferably the liquid one, may be absent in the whip and be present as a liquid component in the final mixing, preferably mixed with the sugar prior to adding the whip, and thereby serving to oil the crystal surfaces.

Heretofore, it has been difficult to use more than 5 parts of stearin per 1000 parts of doughnut sugar, on account of the resulting high melting point of the fat. This causes the sugar to have over-slip and also to slip off the doughnut. By the present invention, the amount of stearin may be raised to 25 parts per 1000 parts of doughnut sugar without leading to over-slip or to slipping off the doughnut. This may be done by forming an initial whip lacking in the high-melting fat and then adding the latter as a melt and again whipping. A doughnut sugar so made has increased stability in the presence of heat and moisture, and is stable on water-soaked, spongy yeast-raised doughnuts.

As stated above, the manner of using the components of the fat predetermines the properties of the doughnut sugar. The ultimate fat of said three components may be of the same analytical composition and be present in the same proportion in doughnut sugars having different properties. In one case, all of the fat components may be mechanically plasticized as a single fat, giving one distinct sugar. In a different case, the normally liquid component may be absent in the whip and be present with the sugar. In still another case, the high-melting component may be absent in the initial whip of the low and medium melting components, and then the high-melting component is melted, added to the whip, and then whipped into it. In still another case, the liquid component of the fat may be first mixed with the sugar, while the medium-melting component is whipped, and then the melted high-melting component is added to the whip and then whipped into it. The greater the spread in molecular weights among the components of the fat, the greater is the decrease in viscosity by mechanically plasticizing. By increasing the content of the high-melting fat, such as the stearin, the present invention thereby effects greater plastic flow for mixing with the doughnut sugar solids.

It is well known that coarse dextrose particles in a doughnut sugar will not adhere to a doughnut, and in consequence fine particles are present. As a criterion for satisfactory doughnut sugars, a grade is used of which 50% or more passes a standard No. 100 screen having square openings 0.149 millimeter on a side, and 10% or less passes a standard No. 50 screen having square openings 0.297 millimeter on a side. Dextrose is commercially available as its monohydrate and as its anhydrous form. These have been used each alone, or together in various proportions, to control the ultimate characteristics of the doughnut sugar.

Although starch may be omitted, it is preferred in order to give the doughnut sugar the desired properties for mechanical handling in conventional doughnut-sugaring machines. Any edible starch may be used such as pearl, rice, potato, manioca, and tapioca. Starch as natural grains or in its gelatinized form may be used.

Example 1

| | Parts by weight |
|---|---|
| Dextrose | 87.5 |
| Corn starch | 9.0 |
| Fat as whip | 3.5 |

Example 2

| | Parts by weight |
|---|---|
| Dextrose | 86 |
| Corn starch | 5 |
| Fat as whip | 9 |

Example 3

A body of 56 parts medium-melting shortening (90° to 120° F.) is whipped for 5 minutes. Then 14 pounds of melted stearin is added and the mass whipped for 5 minutes.

The following ingredients, including the above whip are then mixed for 30 minutes, then milled and packed.

| | Parts by weight |
|---|---|
| Dextrose | 910 |
| Whip | 70 |
| Starch | 10 |
| Corn oil | 10 |

Example 4

| | Parts by weight |
|---|---|
| Dextrose | 920 |
| Whip (of Example 3) | 70 |
| Corn oil | 10 |

Process as in Example 3.

Reference is made to my copending application Serial No. 626,095, filed December 4, 1956, in which I have disclosed the advantages of substituting a small amount of kaolin for larger amounts of starch in doughnut sugars. Because the whipped fat may be used when using kaolin as well as when using starch, the following example is included, although it is also disclosed in said copending application.

Example 5

The following materials are used:

| | Parts by weight |
|---|---|
| Dextrose | 905 |
| Fat whip | 80 |
| Kaolin | 15 |

A body of 56 parts of medium-melting shortening (90° to 120° F.) is whipped for 5 minutes. Then 14 parts of melted stearin is added and the mass whipped for 5 minutes. Then corn oil is added and mixed in for 3 to 5 minutes. The resulting whip is then mixed with the dextrose. Then the kaolin is mixed in.

In general kaolin in amounts in the range from 0.5% to 1.5% by weight performs the functions of 5% to 20% of starch in preventing over-slip caused by the presence of fat. Higher amounts of kaolin absorb too much fat from the doughnut, causing discoloration of the applied sugar, and amounts less than 0.5% are not noticeably effective. Edible grades of kaolin are employed, such as meet the standards of National Formulary IX. Accordingly, starch and kaolin, and the usage thereof, are referred to in the claims as effective quantities of anti-over-slip agents.

The invention is not limited to the examples hereinabove given by way of illustration and modifications and other formulations are contemplated as falling within the scope of the invention as expressed in the appended claims.

I claim:

1. The method of compounding doughnut sugar having a major proportion of dextrose crystals and a minor proportion of normally solid edible fat, which comprises plasticizing at least a thixotropic portion of the fat from a harder solid state by mechanical working, and mixing the resulting fat while in its plasticized state with the remaining ingredients of the doughnut sugar including the dextrose crystals.

2. The process of claim 1 in which an effective quantity of an anti-over-slip agent is present.

3. The process of claim 2 in which the said agent is starch in an amount in the range from 5% to 20% by weight of the composition.

4. The process of claim 1 in which all the fat content of the doughnut sugar is mechanically plasticized.

5. The process of claim 1 in which normally solid components of the fat are mechanically plasticized, and in which a normally liquid component of the fat is present with the sugar crystals when mixed with the plasticized fat.

6. The process of claim 1 in which the fat is plasticized by mechanical whipping to incorporate air.

7. The process according to claim 1 in which a portion of the total fat of the doughnut sugar, which portion is lacking in a high-melting component of the fat, is initially plasticized by mechanical working, followed by adding said component in melted form to the resulting whip, and then followed by mechanically working the resulting fat.

8. The process of claim 1 in which the medium-melting component of the total fat of the doughnut sugar is initially plasticized by mechanical working, followed by mechanically working into the plasticized medium-melting component the high-melting component in melted form, and followed by mechanically working into the resulting plasticized mixture the normally liquid component of the total fat of the doughnut sugar.

9. The process of claim 2 in which the said agent is kaolin in an amount in the range from 0.5% to 1.5% by weight of the composition.

10. The method of compounding doughnut sugar having a major proportion of dextrose crystals and a minor proportion of normally solid edible fat, which comprises first softening at least a hard portion of all the ingredients of the fat by mechanically working said portion to a softer thixotropic state, and while said portion is in said state mixing it with the remaining ingredients of the doughnut sugar.

11. The method of compounding doughnut sugar having a major proportion of dextrose crystals and a minor proportion of normally solid edible fat, which comprises plasticizing at least a thixotropic portion of the fat from a harder solid state by mechanical working, and mixing the resulting fat while in its plasticized state with the remainder of the total content of fat and dextrose.

12. The method of compounding doughnut sugar having a major proportion of dextrose crystals and a minor proportion of normally solid edible fat, which comprises plasticizing at least a thixotropic portion of the fat from a harder solid state by mechanical working, and mixing the resulting fat while in its plasticized state with the remainder of the total content of fat and dextrose, and then mixing in anti-slip agent selected from the group consisting of starch and edible kaolin.

13. The method of compounding doughnut sugar having a major proportion of dextrose crystals and a minor proportion of normally solid edible fat, which comprises first softening at least a hard portion of all the ingredients of the fat by mechanically working said portion to a softer thixotropic state, and while said portion is in said state mixing it with the dextrose crystals.

14. The method of compounding doughnut sugar having a major proportion of dextrose crystals and a minor proportion of normally solid edible fat, which comprises first softening at least a hard portion of all the ingredients of the fat by mechanically working said portion to a softer thixotropic state, and while said portion is in said state mixing it with the dextrose crystals, and then mixing in anti-slip agent selected from the group consisting of starch and edible kaolin.

References Cited in the file of this patent

UNITED STATES PATENTS

| | | |
|---|---|---|
| 2,012,506 | Griffith | Aug. 27, 1935 |
| 2,144,371 | Griffith et al. | Jan. 17, 1939 |
| 2,739,896 | Block et al. | Mar. 27, 1956 |

FOREIGN PATENTS

| | | |
|---|---|---|
| 348,184 | Great Britain | May 8, 1931 |

OTHER REFERENCES

"The Chemical Senses," by Moncrieff, Leonard Hill Limited, 17 Stratford Place, W. 1, London, 1944, pages 296 and 297.